3,130,181
PREPARATION OF COLLOIDAL PARTICLES OF POLYCARBONAMIDES

Frederic L. Sievenpiper, Alden, N.Y., assignor to Allied Chemical Corporation, New York, N.Y., a corporation of New York
No Drawing. Filed Apr. 10, 1959, Ser. No. 805,360
10 Claims. (Cl. 260—78)

This invention relates to the preparation of superpolyamides, namely, polycarbonamides, in finely divided form, i.e. of colloidal particle size, and thus is useful in the preparation of superpolyamides as stable colloidal dispersions or ultra fine powders.

The invention is applicable to the processing of superpolyamides, commonly called nylon, including polymers of caprolactam (nylon 6) and hexamethylene adipamide (nylon 66). The preparation of these polymers is well known, and is disclosed, for example, in United States Patent 2,345,533 of March 28, 1944, and in numerous other patents and publications. Hence, it is considered unnecessary to further describe these useful polymers or their production. In the interests of brevity, they will be referred to hereinafter as polyamides.

The treatment of the polyamides by mixing with methanol, glycol or glycerin solvent and heating under superatmospheric pressure to a temperature to dissolve the polyamide followed by cooling to cause the polyamide to solidify in the form of small particles has been suggested. Such procedures produce a relatively coarse product; that is, the particles resulting from such procedures are not of colloidal size.

It is among the objects of the present invention to provide a process for treating polyamides which results in polyamides of ultra fine particle size, i.e. colloidal fineness, and this without appreciable degradation of the polyamide polymer.

Another object of this invention is to provide a process which results in the production of stable colloidal suspensions of polyamides.

These objects and other advantages ancillary thereto will be apparent from the following description of the present invention.

In accordance with the present invention, a mixture of polyamide, water and an aliphatic or cycloaliphatic ketone, or mixture thereof in an non-oxidizing atmosphere, is heated under pressure to a temperature at which the polyamide is molten but below the temperature at which substantial decomposition of the polyamide takes place, while agitating the mixture. The mass is maintained at such temperature for a period of time sufficient to effect emulsification of the molten polyamide in the aqueous ketone, and thereafter the emulsion is cooled while continuing the agitation. The molten polyamide solidifies during the cooling in ultra fine particle size; a stable colloidal suspension results. If desired, some or all of the liquid component is removed, for example, by evaporative distillation.

The aliphatic and/or cycloaliphatic ketone employed can be acetone, methyl ethyl ketone, methyl isobutyl ketone, cyclohexanone, methyl cyclopentanone, 2-methyl cyclohexanone, methyl isoamyl ketone, dibutyl ketone, etc., or a mixture of such ketones. Preferably, aliphatic and cycloaliphatic ketones having from 3 to 6 carbon atoms are used. The amount of such ketone used is at least about 30% by volume based on the volume of water used, preferably from about 30% to about 50% by volume. The use of less than 30% by volume of ketone based on the volume of water deleteriously affects the fineness of the particles. The use of more than 50% by volume does not result in any further improvement in the particle size. Accordingly, from an economic standpoint, it is preferred to use not more than about 50% by volume of the ketone based on the volume of water.

The amount of water used is at least 4, preferably from 4 to 25 or more parts by weight based on the weight of the polyamide; the upper limit of this range is dependent chiefly on the size of the available equipment and economic considerations.

The process is carried out by heating the mixture of polyamide, water and ketone in a non-oxidizing atmosphere while vigorously agitating the mixture. After the mixture is introduced into an autoclave or other closed vessel, residual air is removed by boiling the mixture or passing nitrogen or carbon dioxide into the vessel to effect such removal. The heating is preferably carried out under a blanket of inert gas, such as nitrogen or carbon dioxide, to provide the desired non-oxidizing atmosphere.

The mixture is heated to a temperature at which the polyamide is molten but not exceeding the temperature at which the polyamide undergoes appreciable depolymerization, e.g. about 180° C. In general, the temperature should be at least 120° C. The preferred temperature to which the mixture is heated is within the range of 135° to 165° C. The minimum temperature will, of course, depend on the temperature at which the polyamide treated is molten; the higher the average molecular weight of the polyamide, the higher the temperature to which the mixture is heated. This temperature differs for different polyamides. During this heating the mixture is agitated vigorously and maintained at the temperature to which it is heated for a period of time long enough for emulsification of the molten polyamide in the aqueous ketone to take place. In general, from ½ to 3 hours, preferably about 1 hour, gives satifactorily emulsification.

The pressure under which the mixture is heated may be that developed at the operating temperature; higher pressures can be used if desired. In general, operating pressures within the range of from 35 to 150 p.s.i.g. are employed, thus avoiding the necessity of using expensive equipment capable of withstanding appreciably higher pressures.

The temperature employed, the type of polyamide undergoing treatment, the ketone used, the ratio of water to ketone, and the rate of agitation used are interrelated. For any particular polyamide, the conditions giving the optimum result can readily be determined by a few trials operating within the ranges of conditions given herein, polyamide particles of colloidal fineness are produced which are not altered in so far as the original physical properties of the polymer are concerned. For example, the intrinsic viscosity of solutions made by dissolving the ultra fine particles and the original polyamide in a solvent such as m-cresol, the relative viscosities of solutions in formic acid and the absence of extractables (the presence of which indicates depolymerization) demonstrate that the process of this invention does not cause alteration of the physical properties of the polymer. Polyamides can be reprocessed several times by the procedure of this invention without noticeable effect on the quality of the polyamide polymer.

The reason or reasons why the present invention results in the surprisingly ultra fine polyamide particles without appreciable degradation of the polymer is not known. The presence of the ketone undoubtedly lowers the temperature to which the mixture need be heated to melt the polyamide. The ketone, it is believed, has a softening or solvating effect on the polyamide, thereby reducing the temperature at which it melts. The ketone also acts as an emulsifying agent, assisting in the emulsification of the molten polyamide in the aqueous phase, the latter probably being the external phase of the emulsion. Thus, exceedingly finely dispersed polyamide particles are present in the emulsion. When the emulsion is cooled, aided by vigorous agitation, the finely dispersed polyamide particles solidify into ultra fine particles. It will be understood that this invention is not to be limited to the above explanation.

This process is applicable to the treatment of virgin and used polyamides such as waste or scrap nylon in the form of pellets, filaments, comminuted irregular shaped particles, rejects from molds, scrap turnings from machining or stamping operations, discarded used articles, etc.

The following examples are illustrative of the process of the present invention. It will be understood the invention is not limited to these examples. In the examples, parts are by weight unless otherwise noted and temperatures are given in ° C.

*Example I*

2500 parts by volume of deaerated water, 1500 parts by volume of cyclohexanone and 400 parts of nylon 6 (polycaprolactam) pellets were introduced in a steel autoclave equipped with an impeller agitator, thermometer well and a pressure gauge. The autoclave was flushed with nitrogen, then heated to and maintained at 135° to 140° for one hour while agitating the mixture vigorously. The mixture was then cooled to about 30° while continuing the agitation. A stable colloidal dispersion of the nylon in the aqueous cyclohexanone resulted.

When this process was repeated using nylon 66 (polyhexamethylene adipamide) a comparable stable colloidal-dispersion of nylon 66 in aqueous cyclohexanone was obtained.

*Example II*

This example differed from Example I in that 1500 parts by volume of acetone were substituted for the cyclohexanone and the mixture heated to and maintained at 160° to 165° for about one hour. The resultant slurry was filtered and the filtered material dried in a circulating warm air drier. The undried product was ultra fine nylon readily dispersible in an aqueous medium to produce a stable colloidal dispersion.

*Example III*

This example differed from Example I in that 1500 parts by volume of methyl ethyl ketone were substituted for the cyclohexanone and the mixture was heated to and maintained at 145° to 150° for about one hour. The resultant slurry was distilled to remove the methyl ethyl ketone. A stable colloidal dispersion of the nylon in an aqueous medium was thus produced.

In the above examples other aliphatic and/or cycloaliphatic ketones, such, for example, as methyl cyclopentanone, 2-methyl cyclohexanone, methyl isobutyl ketone, methyl isoamyl ketone, dibutyl ketone, etc., and mixtures of such ketones when substituted for the cyclohexanone, acetone and methyl ethyl ketone in Examples I, II and III, respectively, produce ultra fine nylon particles.

It will be noted that the present invention provides a process of producing polyamides in ultra fine particle size, which when added to an aqueous medium result in stable colloidal suspensions of the polyamides. The average particle size of the dried particles varies from less than 1 to 20 microns in diameter. Moreover, the present invention results in the direct production of stable colloidal dispersions of the polyamide in the aqueous ketone.

While the invention has been described above, and illustrated by several examples, it should be understood that variations in the details and mode of operation can be made without departing from the scope of this invention which is to be limited only by the claims appended hereto.

What is claimed is:

1. The process for preparing finely divided synthetic linear polycarbonamides of colloidal size, which comprises heating in a non-oxidizing atmosphere a mixture comprising a synthetic linear polycarbonamide, at least 4 parts of water based on the weight of the polycarbonamide, and a ketone from the group consisting of aliphatic ketones, cycloaliphatic ketones, and mixtures of such ketones, to a temperature above that at which the polycarbonamide becomes molten but below that at which substantial decomposition of the polycarbonamide takes place, while agitating the mixture, the amount of said ketone present in the mixture being at least 30% by volume based on the volume of water present and such as to result in the formation of an emulsion of the molten polycarbonamide in water and ketone when the mixture is subjected to said agitation, and thereafter cooling the said emulsion while continuing the agitation to form said finely divided particles of the polycarbonamide.

2. The process as defined in claim 1 in which the ketone has from 3 to 6 carbon atoms.

3. The process as defined in claim 1, in which the mixture is heated to a temperature of from 120° to 180° C. under autogenous pressure.

4. The process as defined in claim 1, in which 100 parts by volume of water are mixed with 30 to 50 parts by volume of ketone, and the mixture is heated to a temperature of 135° to 165° C. under a pressure of from 35 to 150 p.s.i.g.

5. The process as defined in claim 4, in which the ketone is cyclohexanone.

6. The process as defined in claim 4, in which the ketone is acetone.

7. The process as defined in claim 4, in which the ketone is methyl ethyl ketone.

8. The process as defined in claim 4, in which the ketone is methyl isobutyl ketone.

9. The process as defined in claim 4, in which the ketone is methyl cyclopentanone.

10. The process as defined in claim 1, in which the water is present in an amount of from 4 to 25 parts by weight based on the weight of the polycarbonamide.

References Cited in the file of this patent

UNITED STATES PATENTS

| 2,473,920 | Taylor | June 21, 1949 |
| 2,742,440 | Stott et al. | Apr. 17, 1956 |

FOREIGN PATENTS

| 688,771 | Great Britain | Mar. 11, 1953 |

OTHER REFERENCES

Polyamide Resins: Rheinhold Plastics Application Series; Rheinhold Publishing Corp.; New York, 1950.